United States Patent

[11] 3,630,330

| [72] | Inventor | Wolfgang Pflugner<br>Herzogenaurach, Germany |
|---|---|---|
| [21] | Appl. No. | 36,560 |
| [22] | Filed | May 12, 1970 |
| [45] | Patented | Dec. 28, 1971 |
| [73] | Assignee | Industriewerk Schaeffler, OHG<br>Herzogenaurach, Germany |
| [32] | Priority | June 11, 1969 |
| [33] | | Germany |
| [31] | | G 69 23 286.6 |

[54] OVERRUNNING ROLLER CLUTCH
4 Claims, 5 Drawing Figs.

[52] U.S. Cl. ............................................. 192/45
[51] Int. Cl. ....................................... F16d 41/07
[50] Field of Search............................................ 192/44, 45;
188/82.84; 308/217; 24/73 B, 81 B

[56] References Cited
UNITED STATES PATENTS

| 3,031,053 | 4/1962 | Sauzedde et al............. | 192/45 |
| 3,279,727 | 10/1966 | Buttriss........................ | 24/73 B X |
| 2,371,653 | 3/1945 | Schuckers..................... | 192/45 |
| 3,537,555 | 11/1970 | Herzpgenaurach et al... | 192/45 |
| 2,739,022 | 3/1956 | Hinz.............................. | 24/81 B X |

FOREIGN PATENTS

| 434,356 | 8/1935 | Great Britain................ | 188/82.84 |

Primary Examiner—Allan D. Herrmann
Attorney—Hammond & Littell

ABSTRACT: A novel grip overrunning roller clutch consisting of an inner or outer race provided with camming surfaces and a cage connected thereto to secure it against rotation relative to the race, the cage being provided with crossbars on which spring elements are mounted by holding clips which surround the radially directed lateral surfaces of the crossbars and which make the grip rollers resilient in the circumferential direction.

PATENTED DEC 28 1971 3,630,330
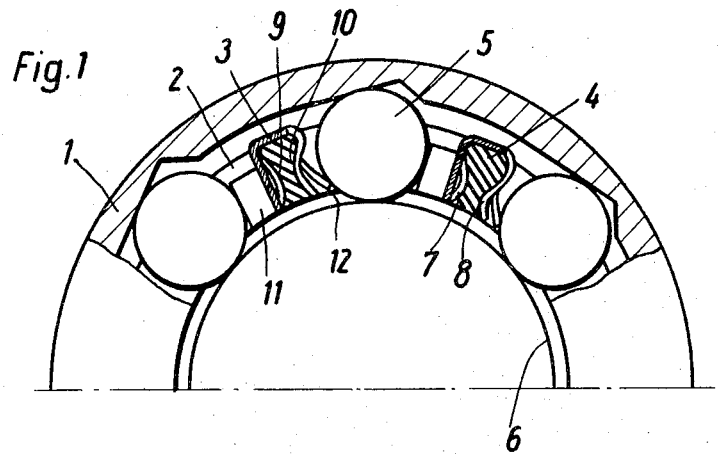
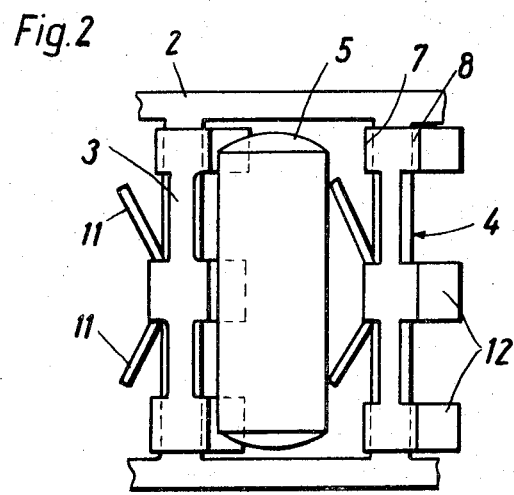
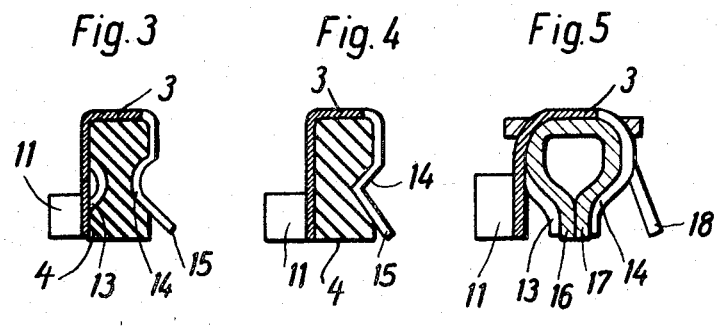
Inventor:
WOLFGANG PFLUGNER
By [signature] Attorneys

OVERRUNNING ROLLER CLUTCH

STATE OF THE ART

Known grip overrunning roller clutches have separate spring elements for each roller to obtain particularly quick responses whereby the change from unlocked to lock position occurs with a very small angle of rotation of the inner race to the outer race. Because of this, such roller clutches are particularly suited for use where the operational states change quickly or where the accurate transmission of the angle of rotation is important.

In one type of overrunning roller clutch, the spring elements are mounted on crossbars having a rectangular cross section but with this construction the spring elements may come off of the crossbars before assembly of the clutch or at least shift from their proper position so that the known assembled clutch unit is not dependable.

OBJECTS OF THE INVENTION

It is an object of the invention to provide a novel overrunning roller clutch in which the assembly is reliably accurate.

It is a further object of the invention to provide a novel overrunning roller clutch wherein the spring elements are securely mounted on the crossbars so the unit can be dependably assembled.

These and other objects and advantages of the invention will become obvious from the following detailed description.

THE INVENTION

The novel overrunning roller clutch of the invention is comprised of an inner race or outer race provided with camming surfaces, and a cage secured against rotation relative to the race provided with camming surfaces and provided with pockets for accommodating rollers formed by crossbars, and rollers in said pockets said crossbars having spring elements mounted on their radially directed lateral surfaces by holding clips engaging recesses in the said lateral surfaces to securely fasten the said clips.

The advantage of the overrunning roller clutch of the invention resides in the fact that the spring elements can be simply mounted onto the cage crossbars and can be held without a special holding device. The invention provides an assembled unit consisting of an inner or outer race provided with camming surfaces and a cage with rollers accommodated in pockets in which the roller travelling surface opposite the cammed surface is missing and is formed by the mounting of the clutch such as on a shaft.

In one embodiment of the invention, the crossbars have an X-shaped cross section and the holding clips of the spring elements engage the recess formed by the taper of the X-shape. These cage crossbars have the advantage of greater rigidity and therefore greater angular impulse so that cages made of synthetic resins can be used. The tapering of the cross section of the crossbar also permits the accommodation of rollers on a given race diameter which results in a greater transferable moment.

In a further embodiment of the invention, each holding clip of the spring element is provided with a projection on its end to secure the adjacent roller against radial dislocation.

Referring now to the drawings,

FIG. 1 is a partial cross section through an overrunning roller clutch embodiment of the invention.

FIG. 2 is a partial plan view of the cage of the clutch of FIG. 1 with the spring elements mounted on the crossbars of the cage.

FIGS. 3, 4 and 5 are cross-sectional views of the profile of the cage crossbars with the spring elements mounted thereon. The overrunning roller clutch of FIGS. 1 and 2 consists of an outer race 1 provided with camming surfaces and a cage 2 connected therewith to secure it against rotation relative to the race. Spring elements 3 are mounted on cage crossbars 4 and provide a spring action in the circumferential direction on rollers 5. The raceway surface 6 opposite the outer race 1 is a smooth cylindrical surface formed by a shaft to be mounted. The spring elements 3 are mounted onto the cage crossbars 4 from the side turned towards the camming surface and the holding clips 7 and 8 of the spring elements 3 surround the radially directed lateral surfaces of the crossbars. The said lateral surfaces are provided with recesses 9 and 10 which engage holding clips 7 and 8 in a locked-by shaped manner to securely hold the spring elements 3 on the cage crossbars 4. The spring elements possess on one side tonguelike spring elements 11 for the spring action and on the other side, projections 12 for radially supporting the rollers 5.

FIG. 3 illustrates a cross section of a synthetic resin cage crossbar with an X-shaped profile. The holding clips 13 and 14 engage the crossbar profile in the tapered or recessed portion of the X-shape to securely hold spring element 3. The recess portion can extend over the entire length of the crossbars or only at those places where the holding clips 13 and 14 surround the radially directed lateral surfaces. Holding clip 14 is provided with projection 15 at its end for radial support of the adjacent roller 5. FIG. 4 shows a similar crossbar profile provided with recess in only one radially directed lateral surface of the crossbar.

FIG. 5 illustrates the cross section of a sheet metal cage embodiment of the invention. The two legs 16 and 17 of the cross bar are bent inwardly to provide recesses for engaging the holding clips 13 and 14 of the spring element 3. The spring element is provided with a special projection 18 to secure the adjacent roller against radial dislocation.

Various modifications of the clutch of the invention may be made without departing from the spirit or scope thereof and it is to be understood that the invention is to be limited only as defined in the appended claims.

I claim:
1. An overrunning roller clutch comprising an inner race or outer race provided with camming surfaces, and a cage secured against rotation relative to the race provided with camming surfaces and provided with pockets for accommodating rollers formed by crossbars, and rollers in said pockets, said crossbars having spring elements mounted on their radially directed lateral surfaces, said spring elements being provided with holding clips engaging recesses in the said lateral surfaces to securely fasten the said spring elements.

2. An overrunning roller clutch of claim 1 wherein the cage crossbars have an X-shaped cross section and the holding clips engage the recesses in the X-shape cross section.

3. An overrunning roller clutch of claim 1 wherein each holding clip of the spring elements is provided with a projection on its end to secure the adjacent roller against radial dislocation.

4. An overrunning clutch of claim 1 wherein the recesses extend over the entire length of the crossbar.

* * * * *